(12) United States Patent
Ferguson

(10) Patent No.: US 7,718,956 B2
(45) Date of Patent: May 18, 2010

(54) USE OF ELEMENTAL PULSE NEUTRON SPECTROSCOPY MEASUREMENTS FOR INDEXING BITUMEN VISCOSITY IN THE WELL

(75) Inventor: Grant V. Ferguson, Calgary (CA)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/137,347

(22) Filed: Jun. 11, 2008

(65) Prior Publication Data

US 2008/0308720 A1 Dec. 18, 2008

Related U.S. Application Data

(60) Provisional application No. 60/943,451, filed on Jun. 12, 2007, provisional application No. 61/037,513, filed on Mar. 18, 2008.

(51) Int. Cl.
*G01V 5/10* (2006.01)
(52) U.S. Cl. .................................. 250/269.6
(58) Field of Classification Search .............. 250/269.6
See application file for complete search history.

(56) References Cited

U.S. PATENT DOCUMENTS

| | | | |
|---|---|---|---|
| 3,990,885 A | 11/1976 | Baillie et al. | |
| 4,379,229 A * | 4/1983 | Givens | ................ 250/269.2 |
| 4,390,783 A | 6/1983 | Grau | |
| 4,394,574 A | 7/1983 | Grau et al. | |
| 4,507,553 A * | 3/1985 | Oliver et al. | ............. 250/269.6 |
| 4,712,424 A | 12/1987 | Herron | |
| 5,471,057 A | 11/1995 | Herron | |
| 6,176,323 B1 | 1/2001 | Weirich et al. | |
| 6,630,357 B2 | 10/2003 | Mirotchnik et al. | |
| 6,755,246 B2 | 6/2004 | Chen et al. | |
| 2004/0035755 A1 | 2/2004 | Reeves | |
| 2006/0033022 A1 | 2/2006 | Madigan et al. | |
| 2007/0023626 A1 | 2/2007 | Riley et al. | |
| 2008/0023629 A1* | 1/2008 | Herron et al. | ............. 250/269.6 |

OTHER PUBLICATIONS

J. H. Christensen, A. B. Hansen, U. Karlson, J. Mortensen, O. Andersen, "Multivariate statistical methods for evaluating biodegradation of mineral oil." Journal of Chromatography A, vol. 1090 (Aug. 1, 2005) pp. 133-145, <doi:10.1016/j.chroma.2005.07.025>.*

T. Sasaki, H. Maki, M. Ishihara, S. Harayama, "Vanadium as an Internal Marker To Evaluate Microbial Degradation of Crude Oil." Environmental Science & Technology, vol. 32, No. 22 (Sep. 19, 1998) pp. 3618-3621, <doi:10.1021/es980287o>.*

(Continued)

*Primary Examiner*—Constantine Hannaher
(74) *Attorney, Agent, or Firm*—Mossman Kumar & Tyler PC

(57) ABSTRACT

Elemental analysis of an earth formation is obtained using measurements from a gamma ray logging tool. From the elemental analysis, an estimate of the carbon content and the sulfur, vanadium, nickel, titanium and/or molybdenum content of the formation is determined. A table look-up is used to estimate the viscosity from the elemental composition.

14 Claims, 6 Drawing Sheets
(3 of 6 Drawing Sheet(s) Filed in Color)

TAR SAND EXAMPLES-FIELD LOG

| WEIGHT FRACTIONS | WEIGHT FRACTIONS | WEIGHT FRACTIONS | WEIGHT FRACTIONS |
|---|---|---|---|
| SILICON | MAGNESIUM | ALUMINUM | CARBON |
| CALCIUM | IRON | SULFUR | TITANIUM |
| SILICON [wfsi] 0   0.5 | MAGNESIUM [wfmg] 0   0.25 | ALUMINUM [wfal] 0   0.25 | CARBON [wfc] 0   0.25 |
| (1) | (1) | (1) | (1) |
| CALCIUM [wfca] 0.5   0 | IRON [wffe] 0.25   0 | SULFUR [wfs] 0.25   0 | TITANIUM [wfti] 0.1   0 |
| (1) | (1) | (1) | (1) |

OTHER PUBLICATIONS

Miiller, D. E., A. G. Holba, and W. B. Hughes (1987), "Effects of biodegradation on crude oils," in Exploration for Heavy Crude Oil and Natural Bitumen, Stud. in Geol., vol. 25, edited by R. F. Meyer, pp. 233-241, Am. Assoc. of Pet. Geol., Tulsa, Okla.*

Westaway et al.; "Neutron-Induced Gamma Ray Spectroscopy for Reservoir Analysis", SPE 9461, Jun. 1983, pp. 553-564.

Hertzog; "Laboratory and Field Evaluation of An Inelastic-Neutron-Scattering and Capture Gamma Ray Spectroscopy Tool", SPE 7430, 52nd Annual Fall Technical Conference and Exhibition of the Society of Petroleum Engineers, Houston, Texas, Oct. 1-3, 1978, pp. 1-14.

Gray; "Tutorial on Upgrading of Oilsands Bitumen", Feb. 2004, http://www.ualberta.ca/~gray/Library/Tutorials/Upgrading/sld001.htm, 8 pages.

"Experimental and Theoretical Determination of Heavy Oil Viscosity Under Reservoir Conditions", Final Progress Report, Oct. 1999-May 2003, 3 pages, Contract No: DE-FG26-99FT40615 abstract only.

Kinsey et al.; "Neutron Capture y-Rays from Titanium, Chromium, Iron, Nickel and Zinc", Phys. Rev. 89, 375-385 (1953), APS physics, Physical Review Online Archive, http://prola.aps.org/abstract/PR/v89/i2/p375_1, 1 page, abstract only.

OilTracers L.L.C., "Oil Biodegradation", Oil Biodegradation—Bacterial Alteration of Petroleum, https://oiltracers/com/oilbiodegradation.html, 5 pages.

Meyer et al.; "Heavy Oil and Natural Bitumen—Strategic Petroleum Resources", USGS Fact Sheet 70-03, Aug. 2003, 5 pages, http://pubs.usgs.gov/fs/fs070-03/fs070-03.html.

Neutron Capture y-Rays from Scandium, Vanadium, Manganese, Cobalt, and Cop, Smithsonian/NASA ADS Physics Abstract Service, 1 page, abstract only.

Miiller et al.; "Effects of Biodegradation on Crude Oils", Exploration for Heavy Crude Oil and Natural Bitumen, vol. 25, Meyer, R.F., Ed., The American Association for Petroleum Geologists, Tulsa, 1987, pp. 233-241.

* cited by examiner

TAR SAND EXAMPLES-FIELD LOG

| WEIGHT FRACTIONS SILICON | WEIGHT FRACTIONS MAGNESIUM | WEIGHT FRACTIONS ALUMINUM | WEIGHT FRACTIONS CARBON |
|---|---|---|---|
| CALCIUM | IRON | SULFUR | TITANIUM |
| SILICON [wfsi] <br> 0　　　　0.5 | MAGNESIUM [wfmg] <br> 0　　　　0.25 | ALUMINUM [wfal] <br> 0　　　　0.25 | CARBON [wfc] <br> 0　　　　0.25 |
| (1) | (1) | (1) | (1) |
| CALCIUM [wfca] <br> 0.5　　　　0 | IRON [wffe] <br> 0.25　　　　0 | SULFUR [wfs] <br> 0.25　　　　0 | TITANIUM [wfti] <br> 0.1　　　　0 |
| (1) | (1) | (1) | (1) |

FIG. 5

USE OF ELEMENTAL PULSE NEUTRON SPECTROSCOPY MEASUREMENTS FOR INDEXING BITUMEN VISCOSITY IN THE WELL

CROSS-REFERENCES TO RELATED APPLICATIONS

This application claims priority from U.S. Provisional Patent Application Ser. No. 60/943,451 filed on Jun. 12, 2007 and from U.S. Provisional Patent Application Ser. No. 61/037,513 filed on Mar. 18, 2008.

BACKGROUND OF THE DISCLOSURE

1. Field of the Disclosure

The present disclosure is in the field of pulsed neutron gamma ray excitation testing of geological formations. In particular, the disclosure determines the viscosity of a formation fluid from recorded spectra.

2. Description of the Related Art

Enormous amounts of hydrocarbon reserves occur in the form of heavy oil and tar sand bitumens produced by a process of biodegradation. In such deposits, significant vertical and lateral gradients in the oil composition and oil viscosity can result. In deposits of such sands, recovery of hydrocarbons may be done by steam injection in situ or by strip mining the deposits and processing the recovered material. An important aspect of the recovery operation is the amount of heat or steam needed, and the subsequent processing that is necessary. This, in turn, is directly correlated with the viscosity of the sands. In situ measurements of viscosity measurements are thus of great value in evaluating prospective deposits of oil sands and in the recovery of hydrocarbons from them. Gabitto and Barrufet have done an extensive study of the viscosity of heavy oils and developed a correlation model relating the viscosity to boiling point, API gravity and molecular weight. All of these determinations require recovery of an actual sample of the oil (a laborious procedure in itself) and further laboratory measurements.

NMR techniques have also been used for distinguishing between heavy oil and water. See, for example U.S. Pat. No. 6,755,246 to Chen et al., having the same assignee as the present disclosure. As noted therein, elevated temperatures are necessary to accomplish this. NMR methods are complicated, and the elevated temperatures necessary for the method of Chen adds further complication. The present disclosure addresses this problem using the novel approach of elemental analysis of gamma ray spectra made with a logging tool.

Well logging systems have been utilized in hydrocarbon exploration for many years. Such systems provide data for use by geologists and petroleum engineers in making many determinations pertinent to hydrocarbon exploration and production. In particular, these systems provide data for subsurface structural mapping, defining the lithology of subsurface formations, identifying hydrocarbon-productive zones, and interpreting reservoir characteristics and contents. Many types of well logging systems exist which measure different formation parameters such as conductivity, travel time of acoustic waves within the formation and the like.

One class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a neutron source carried by the tool and pulsed at a preselected interval.

In these nuclear well logging systems, reliance is made upon the physical phenomenon that the energies of gamma rays given off by nuclei resulting from natural radioactive decay or induced nuclear radiation are indicative of the presence of certain elements within the formation. In other words, formation elements will react in predictable ways, for example, when high-energy neutrons on the order of 14.2 MeV collide with the nuclei of the formation elements. Different elements in the formation may thus be identified from characteristic gamma ray energy levels released as a result of this neutron bombardment. Thus, the number of gamma rays at each energy level will be functionally related to the quantity of each element present in the formation, such as the element carbon, which is present in hydrocarbons. The presence of gamma rays at a 2.2 MeV energy level may for example, indicate the presence of hydrogen, whereas predominance of gamma rays having energy levels of 4.43 and 6.13 MeV, for example, may indicate the presence of carbon and oxygen respectively.

In these nuclear well logging systems, it is frequently useful to obtain data regarding the time spectral distributions of the occurrence of the gamma rays. Such data can yield extremely valuable information about the formation, such as identification of lithologies that are potentially-hydrocarbon producing. Moreover, these desired spectral data may not only be limited to that of natural gamma rays, for example, but also may be desired for the gamma ray spectra caused by bombardment of the formation with the aforementioned pulsed neutron sources.

Well logging systems for measuring neutron absorption in a formation use a pulsed neutron source providing bursts of very fast, high-energy neutrons. Pulsing the neutron source permits the measurement of the macroscopic thermal neutron absorption capture cross-section $\Sigma$ of a formation. The capture cross-section of a reservoir rock is indicative of the porosity, formation water salinity, and the quantity and type of hydrocarbons contained in the pore spaces.

The measurement of neutron population decay rate is made cyclically. The neutron source is pulsed for 20-40 microseconds to create a neutron population. Neutrons leaving the pulsed source interact with the surrounding environment and are slowed down. In a well logging environment, collisions between the neutrons and the surrounding fluid and formation atoms act to slow these neutrons. Such collisions may impart sufficient energy to these atoms to leave them in an excited state, from which after a short time gamma rays are emitted as the atom returns to a stable state. Such emitted gamma rays are labeled inelastic gamma rays. As the neutrons are slowed to the thermal state, they may be captured by atoms in the surrounding matter. Atoms capturing such neutrons are also caused to be in an excited state, and after a short time gamma rays are emitted as the atom returns to a stable state. Gamma rays emitted due to this neutron capture reaction are labeled capture gamma rays. In wireline well logging operations, as the neutron source is pulsed and the measurements made, the subsurface well logging instrument is continuously pulled up through the borehole. This makes it possible to evaluate formation characteristics over a range of depths.

Depending on the material composition of the earth formations proximal to the instrument, the thermal neutrons can be absorbed, or "captured", at various rates by certain types of atomic nuclei in the earth formations. When one of these atomic nuclei captures a thermal neutron, it emits a gamma ray, which is referred to as a "capture gamma ray".

Prior art methods exist for determining attributes of a formation from logging results. See, for example, U.S. Pat. No. 4,712,424, to Herron, U.S. Pat. No. 4,394,574, to Grau et al., U.S. Pat. No. 4,390,783, to Grau, SPE 7430, SPE9461, and U.S. Pat. No. 5,471,057, to Herron.

SUMMARY OF THE DISCLOSURE

One embodiment of the disclosure is a method of estimating a viscosity of a fluid in an earth formation. The method includes conveying a tool into a borehole in the earth formation and pulsing the formation with radiation from the tool. Gamma rays resulting from interaction of the pulsed radiation with nuclei in the formation are detected. From a determined spectrum of the gamma rays, an elemental concentration of elements in the formation that are correlated with fluid viscosity is determined. The radiation may include neutrons. The detected gamma rays may include inelastic gamma rays and/or capture gamma rays. The determined spectrum may include an inelastic spectrum. The estimated elements may include sulfur, nickel, titanium, vanadium and/or molybdenum. From the estimated concentration of elements, a table lookup may be performed to determine the formation hydrocarbon fluid viscosity.

Another embodiment of the disclosure is an apparatus for estimating a viscosity of a fluid in an earth formation. The apparatus includes a tool configured to be conveyed in a borehole in the earth formation. The tool includes a radiation source configured to pulse the earth formation with radiation and at least one detector configured to detect gamma rays resulting from interaction of the radiation with the formation. A processor is configured to determine a spectrum of the detected gamma rays and estimate from the determined spectrum an elemental concentration of elements that are correlated with formation viscosity. The radiation source may be a neutron source. The detected gamma rays may include inelastic gamma rays and/or capture gamma rays. The determined spectrum may include an inelastic spectrum. The processor may be configured to estimate the elemental concentration by using an inelastic spectrum. The processor may be configured to estimate the elemental concentration of sulfur, nickel, titanium, vanadium and/or molybdenum. From the estimated concentration of elements, processor may be configured to perform a table lookup to determine the formation hydrocarbon fluid viscosity.

Another embodiment of the disclosure is a computer-readable medium for use with an apparatus for evaluating an earth formation. The apparatus includes a tool configured to be conveyed in a borehole in the earth formation. The tool includes a radiation source configured to pulse the earth formation with radiation and at least one detector configured to detect gamma rays resulting from interaction of the radiation with nuclei in the earth formation. The medium includes instructions which enable a processor to determine a spectrum of the detected gamma rays and to estimate from the determined spectrum an elemental concentration of elements in the formation that are correlated with formation viscosity. The machine readable medium may be a ROM, an EPROM, an EEPROM, a Flash Memory, and/or an Optical disk.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee. The present disclosure is best understood with reference to the accompanying figures in which like numerals refer to like elements and in which:

FIG. 5 (in color) shows the scales used for display of different elements in FIGS. 6-7;

DETAILED DESCRIPTION OF THE DISCLOSURE

Figure 1:
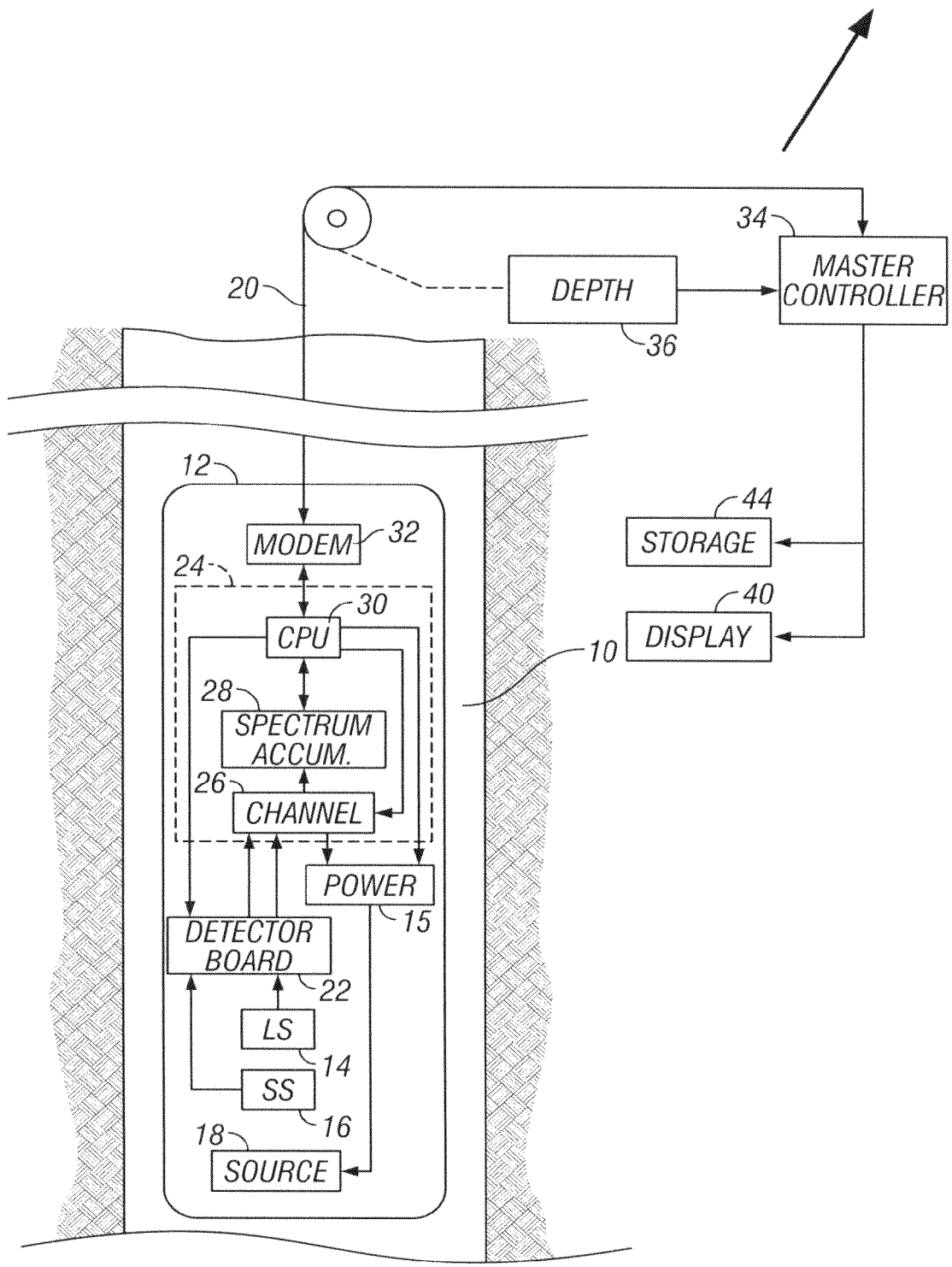
FIG. 1 (Prior Art) illustrates a nuclear well logging configuration in accordance with the present disclosure.

Referring now to the drawings in more detail, and particularly to FIG. 1, there is illustrated a nuclear well logging configuration in accordance with the present disclosure. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In an exemplary embodiment, LS and SS detectors 14 and 16 are comprised of bismuth-germanate (BGO) crystals coupled to photomultiplier tubes. To protect the detector systems from the high temperatures encountered in boreholes, the detector system may be mounted in a Dewar-type flask. Also, in an exemplary embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 converts the output pulse heights to digital values, which are accumulated into pulse height spectra, in which the pulses are sorted according to their amplitudes into a discrete array of bins. The bins uniformly divide the entire amplitude range. These pulse height spectra are accumulated in registers in the spectrum accumulator 28, the spectra being sorted according to their type: inelastic, capture, or background. After a pulse height spectrum has been accumulated, CPU 30 controls the transfer of the accumulated data to the modem 32, which is coupled to cable 20 for transmission of the data over a communication link to the surface apparatus. To be explained later are further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. An input terminal may be coupled to master controller or processor 34 to allow the system operator to provide selected input into master controller 34 for the logging operation to be performed by the system. Display unit 40, and storage unit 44 coupled to the master controller 34 may be provided. The data may also be sent by a link to a remote location. Processing may be done either by the surface processor, at the remote site, or by a downhole processor.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 10,000 bursts/second (10 kHz). This, in turn, causes a burst of high-energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. It will be recalled that detector board 22 amplifies each pulse and compares them to an adjustable discriminator level, typically set at a value corresponding to approximately 100 keV. If such pulse has an amplitude corresponding to an energy of at least approximately 100 keV, the voltage pulse is transformed into a digital signal and passed to channel generator 26 of MCS section 24.

Figure 2:
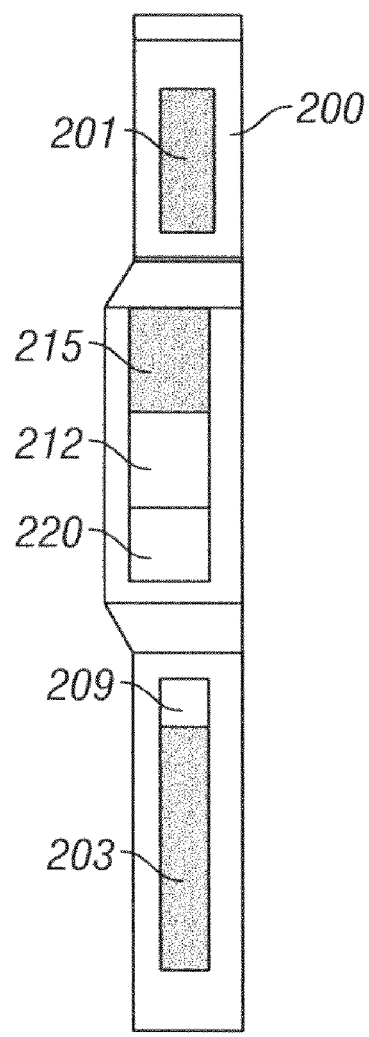
FIG. 2 shows an instrument suitable for use with the present disclosure.

FIG. 2 illustrates a schematic diagram of an instrument suitable for use with the present disclosure. The Formation Lithology Explore (FLEX™) is a wireline instrument designed to provide formation mineralogical information, shale identification, and clay typing. The enhanced mineralogical data obtained from the FLEX™ also enables enhanced porosity measurements. The present disclosure is usable in open-hole wireline logging systems. In a typical embodiment, the present disclosure uses the ECLIPS™ acquisition system of Baker Hughes Incorporated. Alternatively, the present disclosure can be used, for example, with the FOCUS system of Baker Hughes, Incorporated. Also, under most conditions, the FLEX™ is run in combination with Gamma Ray/Spectralog, Neutron, and Density nuclear tools in addition to tools such as resistivity, acoustics, NMR and others. The FLEX™ utilizes an axial pulsed neutron generator of the same type as that used in the reservoir performance monitor instruments. Thus, there are no special storage or transportation requirements except those of a regulatory nature associated with pulsed neutron generators. The logging speed is dependent upon the environment. A typical logging speed is in the range of 15-30 ft/min.

The FLEX™ measurement device of FIG. 2 employs the principle of neutron-induced gamma ray spectroscopy. FLEX™ component parts are encapsulated within wireline device casing 200. The neutron source of the present disclosure is typically a pulsed neutron source. The use of a pulsed neutron source is advantageous over the use of a chemical neutron source due to its ability to generate inelastic gamma rays over a wider range of energies. It also allows a spectrum of capture gamma rays to be generated which is free from inelastic gamma ray contamination, which can also be corrected for background activation gamma rays. Neutron source 209 discharges high-energy bursts of neutrons into the surrounding formation. The electronic pulsed neutron generator is typically operated at a rate of approximately 10,000 Hz, so that each burst takes place within a 100 microsecond window. Gamma rays produced via interaction of the discharged neutrons and the formation are detected at the scintillation detector 212 attached to acquisition and telemetry electronics 215. Power supply 201 enables the FLEX device. Electronics 203 enables the neutron source. A shield 220 attenuates the neutron flux propagating directly from the source to the detector as well as attenuating gamma rays generated within the shield.

Figure 3:
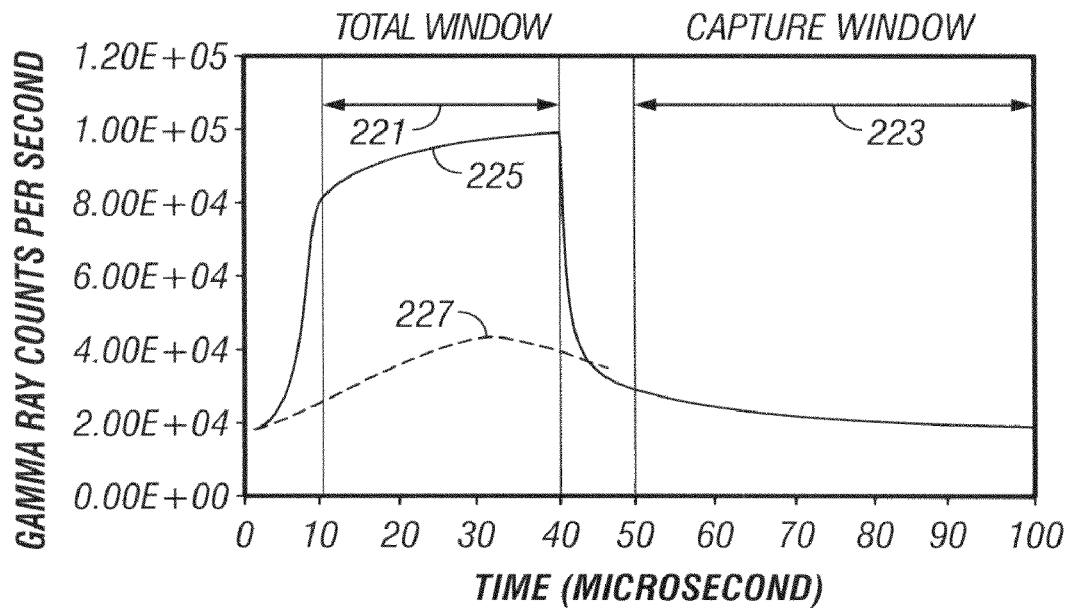
FIG. 3 shows the basic timing of the pulsed neutron source and the produced gamma rays.

FIG. 3 illustrates the basic timing of the pulsed neutron source and the produced gamma rays. Time is displayed along the x-axis in microseconds. The gamma ray counts per second (cps) is displayed along the y-axis. The neutron burst is over a time interval 221 and defines a first-detector-gate interval, referred to as the "burst gate" or inelastic gate. A total spectrum 225 of gamma rays resulting from both inelastic neutron scattering and capture gamma ray scattering is produced during the active duration of the neutron source, and the timing of the inelastic gate enables obtaining the total spectrum. In the example of FIG. 3, the number of counts rises significantly (typically to $10^5$) during the inelastic gate, which extends approximately from 10 μsec to 40 μsec. The deactivation of the neutron source causes the inelastic gamma rays to disappear from the count almost immediately. A "dead-zone" is shown at a point substantially coincident with deactivation of the neutron source. This dead-zone extends approximately from 40 μsec to 50 μsec. The counts obtained during this interval are not recorded. The dead-zone is followed by a "capture gate" 223. The capture gate contains gamma rays substantially due to captured neutrons from the surrounding formation.

In an exemplary embodiment of the present disclosure, energized neutrons are injected from a pulsed neutron source 209 into a surrounding formation. The scintillation detector records the spectrum over a predetermined time interval. During the inelastic gate, a total spectrum 225 of gamma rays is obtained from the formation layer. A portion of the total spectrum 227 is attributable to capture gamma rays. During a capture gate, a capture spectrum of gamma rays is obtained from the formation layer. A determinable factor of the capture spectrum is subtracted from the obtained total spectrum to derive a spectrum substantially representative of an inelastic spectrum only. The elemental contribution to the inelastic spectrum and the capture spectrum can then be obtained by determining a set of constituent spectra from the inelastic spectrum and a set of constituent spectra from the capture spectrum. These constituent spectra are characteristic of individual elements and are referred to as "elemental standards." An operator versed in the arts can then use the determined elemental contributions to determine a parameter of the surrounding formation.

Figure 4:
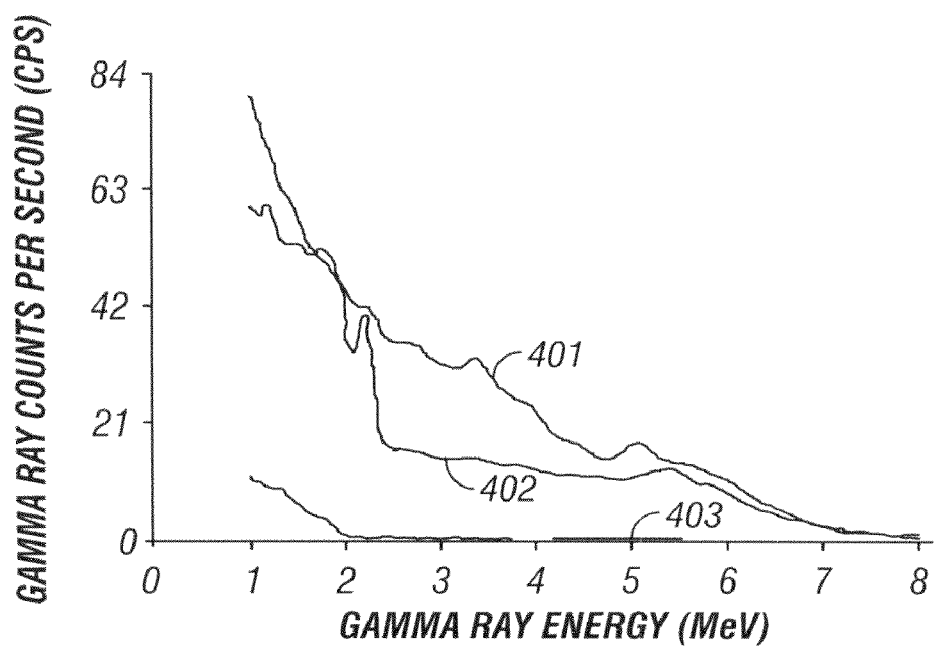
FIG. 4 shows capture and inelastic spectra from limestone formation with an oil-filled borehole.

The derived gamma ray energy spectra for data analysis comprise both the capture spectrum and the inelastic spectrum. An inelastic gamma ray is generated from the nucleus of the atom from which there is a scattering of initial highly energetic neutrons. A capture gamma ray is emitted by the nucleus of an atom through absorption of a neutron after its energy has diminished. FIG. 4 shows capture and inelastic spectra from limestone formation with oil-filled borehole. The three spectra are the inelastic spectrum 401, the capture spectra 402, and the background spectrum 403.

A feature of the present disclosure is the analysis of separate inelastic and capture spectra in terms of their constituent spectra. Prior art discusses methods for removing the effects of a capture spectrum from a total spectrum obtained during a burst gate, consequently obtaining an improved inelastic spectrum. A corrected fraction of the capture spectrum is subtracted from the total spectrum in order to generate a representative inelastic spectrum. The corrected fraction is referred to as the capture subtraction factor. The method for calculating this value comprises using a capture gamma ray response function to estimate the capture and inelastic components within a recorded time spectrum. Analysis of the spectra can be performed uphole or downhole using a processor or expert system.

A library of elemental basis functions can be used to enable a decomposition of at least one of capture and inelastic spectra into their respective constituent spectra. As described in U.S. patent application Ser. No. 11/223,352 of Pemper et al., having the same assignee as the present application and the contents of which are incorporated herein by reference, a partial list of elements includes H, C, O, S, Al, Ca, Cl, Fe, Mg, Si. Currently, constituent spectra representing up to 20 elements are usable in the disclosure of Pemper. When the fraction of a particular element obtained from both the capture and inelastic spectrum are reasonably close, then their average value may be used for the elemental analysis. Large differences between estimates for a particular element obtained by capture and inelastic spectral decomposition should serve as a cautionary flag. As part of the spectral decomposition using basis functions, it is standard practice to also estimate uncertainties along with the regression coefficients. These uncertainties can be used to provide an estimate of the amount of an element from the individual estimates obtained from inelastic and capture spectra. The number of elements can be increased and is not meant as a limitation of the present disclosure. Elemental basis functions could further be produced using various methods. For example, use of a computer can enable generation of an elemental basis function of a previously unlisted element.

The present disclosure is based on the recognition of the fact that the elemental composition of biodegraded oil changes with the amount of degradation, and that this is strongly correlated with changes in viscosity of the oil. Hence measurements of the elemental composition can be correlated with viscosity. For example, in a set of genetically related oils from Oklahoma, Miiller et al. (1987) found the following changes in oil properties with increasing levels of biodegradation:

TABLE 1

(Prior art)

| | API Gravity | Sulfur (wt %) | Vanadium (ppm) | Nickel (ppm) |
|---|---|---|---|---|
| Non-degraded Oil | 32 | 0.6 | 30.6 | 16.4 |
| Moderately Biodegraded Oil | 12 | 1.6 | 224 | 75.1 |
| Heavy Biodegradation (Tar Sand) | 4 | 1.5 | 137.5 | 68.5 |

As can be seen, the low gravity (high viscosity) oils have the highest content of sulfur, vanadium and nickel. High values of sulfur, nitrogen, nickel and vanadium have also been noted by Gray (1994) in Canadian tar sands and are summarized in Table 2:

TABLE 2

(prior art)

| | Sulfur wt % | Nitrogen wt % | Nickel ppm | Vanadium ppm |
|---|---|---|---|---|
| Athabasca | 5.14 | 0.56 | 150 | 290 |
| Cold Lake | 5.10 | 0.45 | 200 | 490 |
| Lloydminster | 4.69 | 0.53 | 140 | 190 |
| Peace River | 7.02 | 0.63 | 130 | 410 |

We next note the following table of thermal capture neutron cross-sections (from the Environmental Chemist):

TABLE 3

| Element | Cross section (barns) |
|---|---|
| Hydrogen | .3326 |
| Carbon | .0035 |
| Oxygen | .00019 |
| Silicon | .171 |
| Aluminum | .232 |
| Calcium | .43 |
| Chlorine | 35.5 |
| Iron | 2.56 |
| Magnesium | .063 |
| Silicon | .171 |
| Sulfur | .53 |
| Vanadium | 5.08 |
| Titanium | 6.09 |
| Molybdenum | 2.66 |

The overall capture cross section of the metals vanadium, titanium and molybdenum and of sulfur is quite large. However, from the standpoint of elemental spectral analysis, sharp peaks in the spectra are more important for resolvability than the total cross section.

As noted in Bartholomew and Kinsey (1953) Physical Review, vol. 89, Issue 2, pp. 386-395: "Vanadium produces several strong γ-rays with intensities of about 10 photons per 100 captures. Of these, the γ-ray with the highest energy, 7.305±0.007 Mev, can be identified with the transition to the ground state of $V^{52}$. A group of partially resolved γ-rays with energies between 7.6 and 8.0 Mev are tentatively ascribed to capture in the rare isotope $V^{50}$. If this interpretation is correct, the isotopic capture cross section of $V^{50}$ probably lies between 40 and 400 barns."

As noted further in Bartholomew and Kinsey, Physical Review, vol. 89, Issue 2, pp. 375-385: "Titanium emits a very simple spectrum. Two strong γ-rays, 6.756±0.006 and 6.412±0.006 Mev, are produced by capture in $Ti^{48}$. Neither the direct transition to the ground state of $Ti^{49}$, nor the transitions to the ground states of $Ti^{48}$ and $Ti^{50}$ were detected. . . . nickel spectrum contains an intense γ-ray with an energy of 8.997±0.005 Mev, which is produced in 50 percent of the captures in $Ni^{58}$. Another prominent γ-ray at 8.532±0.008 Mev may represent the transition to the ground state in $Ni^{61}$; if so, it accounts for some 80 percent of captures in $Ni^{60}$."

Based on the above, and the fact that sulfur is known to be detectable, we conclude that the elements most characteristic of biodegradation can be detected using gamma ray spectroscopy. As noted in Table 1, there is a strong correlation between viscosity and the elements sulfur, nickel and vanadium. In addition, there are processes aimed at recovering titanium from the tar sand deposits. See US Pat. Pub. 2004/0035755 of Reeves and U.S. Pat. No. 3,990,885 to Baillie et al. The present disclosure envisages using lookup tables to relate the fraction of the different elements discussed above to the viscosity. The disclosure also envisages using the ratio of the elements sulfur, vanadium, nickel, titanium and/or molybdenum to the fraction of a common element such as carbon (representing the bulk of the hydrocarbons) for estimation of viscosity.

We next show examples of field logs illustrating the principle of the method. FIG. 5 shows the eight elements that are displayed in the plots of FIGS. 6-7 and the scales of the display. Note that the elements in the upper row have scales running in the opposite direction to the elements in the lower row. This makes the displays easier.

Figure 6:
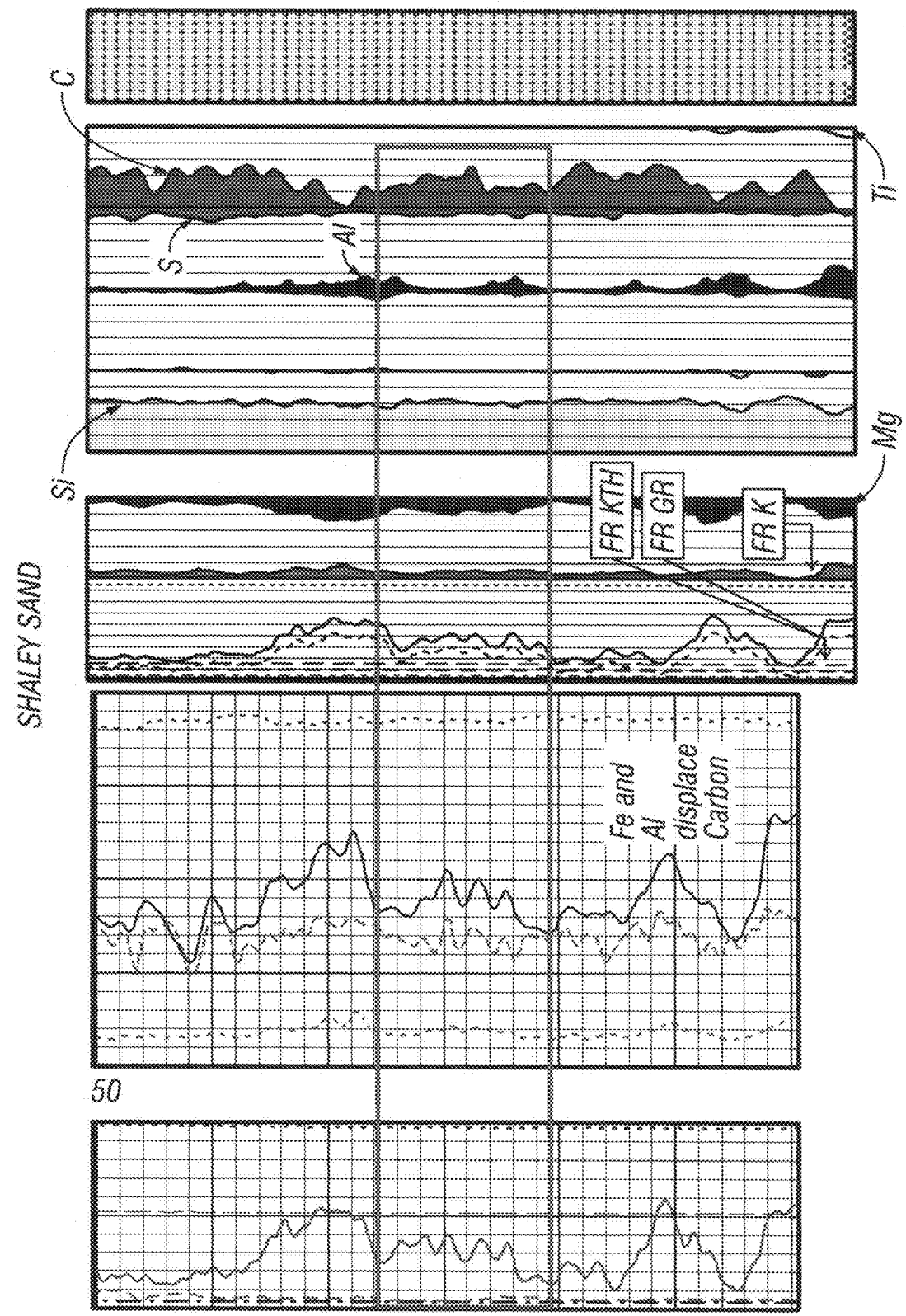
FIG. 6 (in color) shows the elemental composition display in a shaly interval.
Figure 7:
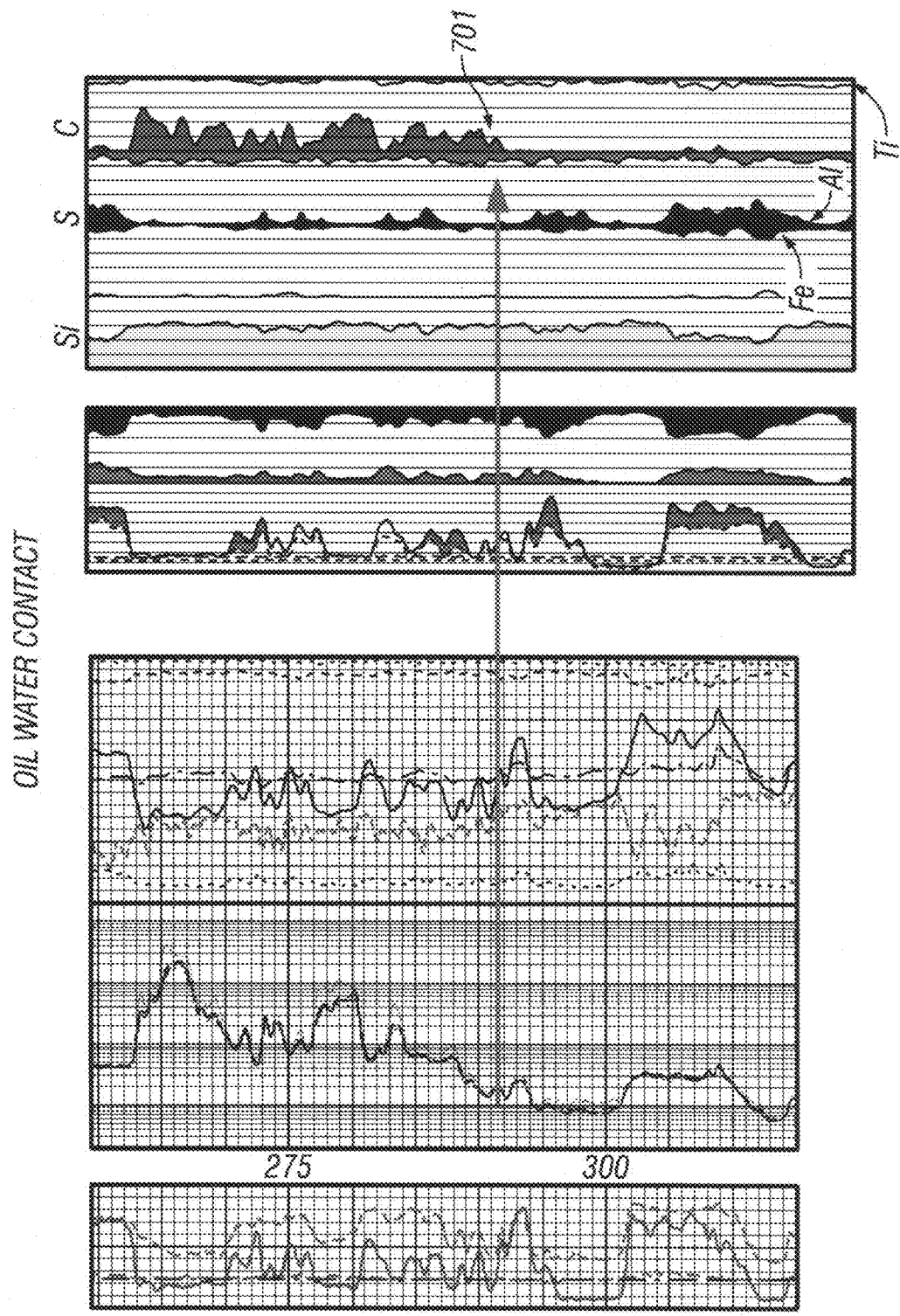
FIG. 7 (in color) shows elemental composition near the oil-water contact.

FIG. 6 shows the elemental display in a shaly sand interval. As expected, the Si content is high. There is very little Ti. FIG. 7 shows a lower section of the well including the oil-water (actually, bitumen-water) contact 701. There is an increasing amount of Fe, S, Al and Ti compared to the section in FIG. 6, indicating increasing biodegradation. At the oil-water contact, the C content drops abruptly. Thus, the ratio of the elemental concentration of Iron, Sulfur, Aluminum and/or Titanium to the total bitumen content (indicated by the Carbon measurement) may be used as an indication of biodegradation.

The disclosure has been described in terms of measurements made using logging tools conveyed on a wireline device in a borehole. The method can also be used using data obtained by sensors conveyed on a slickline. The method can also be used on data obtained using measurement-while-drilling sensors conveyed on a drilling tubular. The processing of the data may be done downhole using a downhole processor or at the surface with a surface processor. It is also possible to store at least a part of the data downhole in a suitable memory device, in a compressed form if necessary. Upon subsequent retrieval of the memory device during tripping of the drillstring, the data may then be retrieved from the memory device and processed uphole.

Implicit in the processing of the data is the use of a computer program on a suitable machine-readable medium that enables the processor to perform the control and processing. The machine-readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. A method of estimating a biodegradation of a fluid in an earth formation, the method comprising:
    conveying a tool into a borehole and pulsing the formation with radiation from the tool;
    detecting gamma rays resulting from interaction of the pulsed radiation with the nuclei in the formation,
    estimating a spectrum of the detected gamma rays;
    using the estimated spectrum to estimate an elemental concentration of elements that are correlated with a biodegradation of the fluid in the earth formation; and
    estimating the biodegradation from a ratio of the elemental concentration of at least one of the elements that are correlated with biodegradation to an elemental concentration of Carbon.

2. The method of claim 1 wherein pulsing the formation further comprises using pulsed neutrons.

3. The method of claim 1 wherein detecting the gamma rays further comprises detecting at least one of: (i) inelastic gamma rays, and (ii) capture gamma rays.

4. The method of claim 1 wherein estimating the spectrum further comprises estimating an inelastic spectrum.

5. The method of claim 1 wherein estimating the elemental concentration further comprises estimating a concentration of at least one of: (i) sulfur, (ii) nickel, (iii) titanium, (iv) vanadium, and (v) molybdenum.

6. The method of claim 1 further comprising using the estimated elemental composition to provide an estimate of the viscosity of the fluid.

7. An apparatus for estimating a biodegradation of a fluid in an earth formation, the apparatus comprising:
    a tool configured to be conveyed into a borehole and pulse the formation with radiation;
    a detector configured to detect gamma rays resulting from interaction of the pulsed radiation with the nuclei in the formation; and
    at least one processor configured to:
        (I) estimate a spectrum of the detected gamma rays;
        (II) use the estimated spectrum to estimate an elemental concentration of elements that are correlated with a biodegradation of a hydrocarbon in the earth formation; and
        (III) estimate the biodegradation from a ratio of the elemental concentration of at least one of the elements correlated with biodegradation to an elemental concentration of Carbon.

8. The apparatus of claim 7 wherein the pulsed radiation comprises neutrons.

9. The apparatus of claim 7 wherein the detector is configured to detect at least one of: (i) inelastic gamma rays, and (ii) capture gamma rays.

10. The apparatus of claim 7 wherein processor is further configured to estimate an inelastic spectrum.

11. The apparatus of claim 7 wherein the processor is further configured to estimate a concentration of at least one of: (i) sulfur, (ii) nickel, (iii) titanium, (iv) vanadium, and (v) molybdenum.

12. The apparatus of claim 7 wherein the tool is configured to be conveyed into the borehole on a conveyance device selected from: (i) a wireline, and (ii) a drilling tubular.

13. A computer-readable medium product having stored thereon instructions which when read by a processor cause the processor to execute a method, the method comprising:
    estimating a spectrum of detected gamma rays resulting from interaction of pulsed radiation with nuclei in a formation;
    using the estimated spectrum to estimate an elemental concentration of elements that are correlated with a biodegradation of a hydrocarbon in the earth formation; and
    estimating the biodegradation from a ratio of the elemental concentration of at least one of the elements correlated with degradation to an elemental concentration of Carbon.

14. The medium of claim 13 further comprising at least one of: (i) a ROM, (ii) an EPROM, (iii) an EEPROM, (iv) a flash memory, and (v) an optical disk.

* * * * *